HENRY WELD. Cultivator.
No. 119,904. Patented Oct. 10, 1871.
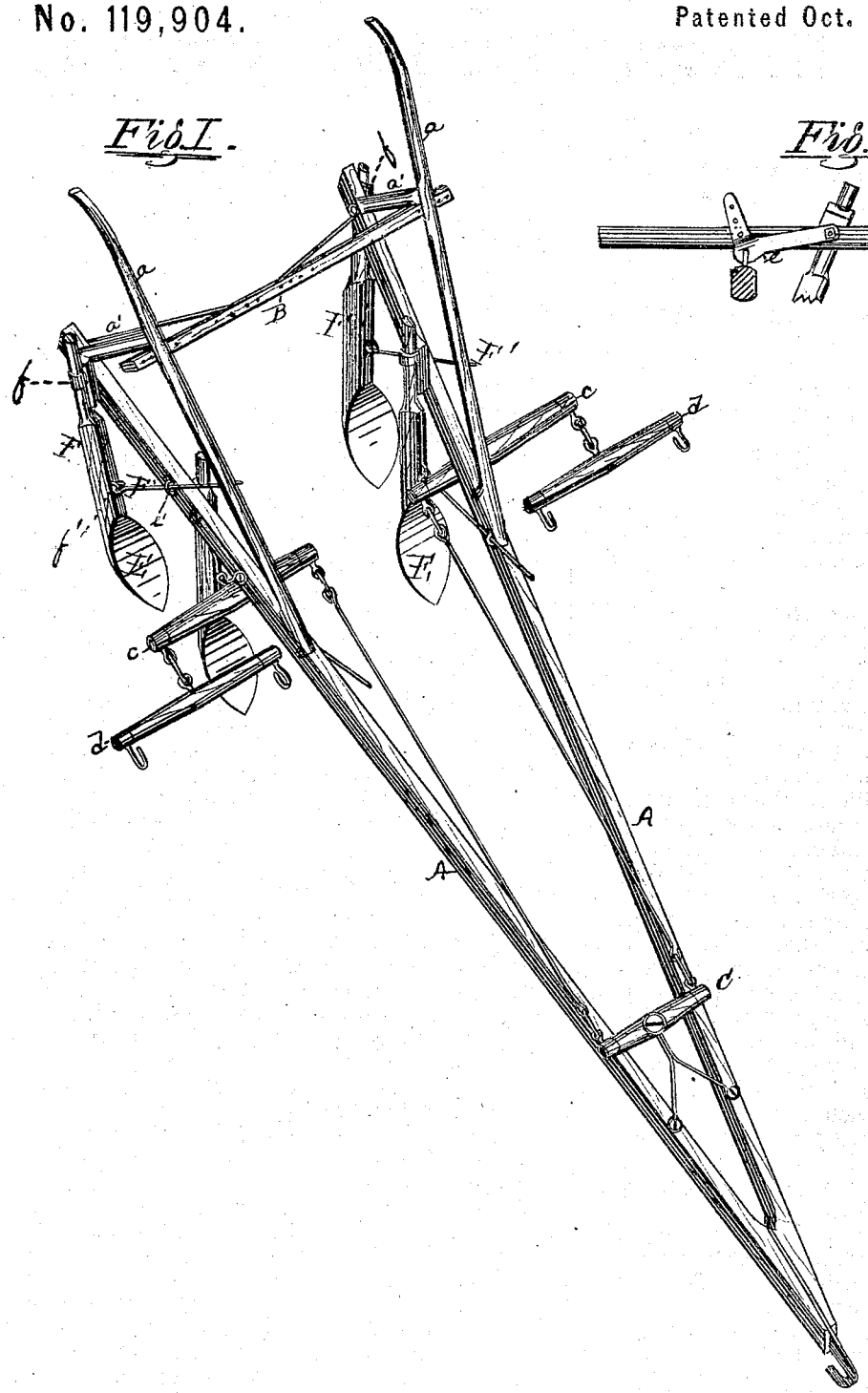
WITNESSES:— INVENTOR:

ns.

UNITED STATES PATENT OFFICE.

HENRY WELD, OF BLACK WALNUT, ILLINOIS.

IMPROVEMENT IN CULTIVATORS.

Specification forming part of Letters Patent No. 119,904, dated October 10, 1871.

*To all whom it may concern:*

Be it known that I, HENRY WELD, of Black Walnut, in the county of Ogle and State of Illinois, have invented a new and useful Improvement in Cultivators; and I do hereby declare that the following is a full and exact description of the same, reference being had to the accompanying drawing and to the letters of reference marked thereon.

This invention relates to that class of corn-cultivators which are adapted to be controlled by a person walking behind the machine; and it consists in certain details of construction, which will be fully described hereinafter.

In the drawing, Figure 1 represents a perspective view of my improved machine; and Fig. 2, a side elevation of portion detached.

To enable others skilled in the art to make and use my invention, I will now proceed to describe fully its construction and manner of operation.

A A represent the main beams of the frame, which, being united together at their front ends in any proper manner, are extended rearwardly in diverging lines in the usual well-known manner. *a a* represent handles, of any proper construction, which, being attached at their front ends to the beams A A, extend rearwardly and upwardly, as shown, and are further secured to the main beams by the vertical standards and securing-rods *a′ a′*, as shown. B represents a cross-bar securely attached to the handles *a*, which bar unites the two parts of the frame firmly together. It is provided with suitable orifices at proper points, by which means the sides of the frame may be adjusted to or from each other, as may be desired. From the beams upon each side depend the usual standards F for carrying the shovels E, these standards being preferably provided with the well-known eyebolt and bearing-block *f*, fastening, for securing the standard to the beam, and also with an eyebolt, *f′*, for securing the brace-rods F′ in place, as clearly shown in the drawing. C represents a short evener pivoted upon a cross-bar uniting the beams A near their front ends, which, being suitably held by braces, is connected, by links and long rods upon each side, to the inner ends of the auxiliary eveners *c c*, which latter have attached to their outer ends the whiffletrees *d d*, as shown. The auxiliary eveners *c* may be held in proper manner; but I preferably provide an L-shaped bar, *e*, Fig. 2, bolted at each end to the main beam, one of the ends of which is slotted to permit adjustment, as indicated in the drawing.

The operation is as follows: The cultivator is drawn by the team in the usual manner across the field, the person controlling the machine walking behind it and guiding it by means of the handles *a a*.

As the neck-yoke forms the pivot of the frame, a long swing is obtained with all its advantages. The shovel-standards may be adjusted higher or lower, if desired, for the purpose of penetrating the ground more or less deeply; but I prefer to adjust instead the eveners *c* upon the beams A, by which means the line of draft is changed and the shovels depressed more or less deeply into the soil. The sides of the frame may be adjusted more or less closely together by means of the cross-bar B and its orifices. By placing the main evener forward upon the frame between the horses I am enabled to lower the rear end of the frame and thus use short standards, while ordinarily, by placing the evener at the rear of the frame, it is necessary to make the frame high in order that the cross-bars may not interfere with the tall corn. To give necessary strength to sustain the draft also, in such cases it is necessary to make the parts strong and heavy. The forward end of the frame in my cultivator is, of course, held up by the horses away from contact with the corn, so that no difficulty occurs.

The machine is exceedingly simple and inexpensive in its construction, and can be made of very light materials without being rendered weak.

It is well known to all who are familiar with the practical operation of cultivators, particularly those which are not mounted upon wheels, that a number of different adjustments is required, not only of the plows relative to the beams and of the beams to each other, but also of the draft, in order to make an implement which shall be adapted to the kind and condition of both crop and soil to be worked; and it will be found, upon examination, that my cultivator can be so adjusted as to meet any exigency. Thus, if it is desired to run the plows close to the corn with a shallow furrow on one side when moving in one direction, turning the soil from the hill, and then, on the return trip, throw a heavier furrow toward the corn, the necessary adjustments can be made by means of the rounded shank F, which permits the angle of the plow to the line of draft, the depth of the plow from the beam, and the angle of the plow-standard to the beam to be regulated, and, as the draft-rod F' is connected to the plow-standard by a dead-eye, e', and to the plow-beam by an eyebolt, it (the draft-rod) can conform readily to any position in which the plow may be placed.

So, also, it is sometimes necessary to adjust the height of the whiffletrees differently upon different sides of the cultivator, and for this purpose I have adopted the L-shaped iron e; but do not claim broadly the combination of the whiffletrees separately with devices for raising or lowering the same and with a device for equalizing the draft between them, as that has been done in earlier cultivators; but, as these devices have been heretofore constructed, it was essential that the beams to which the plows were attached should have a forward and backward movement relative to the draft-beams or frame; that, in fact, there must be two sets of beams or frames; therefore, as I had but one set of beams or one frame, I could not use the old arrangement and was obliged to combine with my devices for adjusting the height of the single-trees the double-trees mounted upon the same beams or frame as that to which the plows are attached; but the double-tree being old, I do not claim it broadly.

Having thus fully described my invention, what I claim as new, and desire to secure by Letters Patent, is—

The combination of the double-tree C, single-tree d, the lever c, the L-shaped adjusting-plates e, and the plows E, all mounted upon the beams A and arranged to operate as set forth.

This specification signed and witnessed this 29th day of June, 1871.

HENRY WELD.

Witnesses:
G. W. FORD,
E. E. HOUSE.

(43)